J. RIETSCHEL.
AUTOBED.
APPLICATION FILED AUG. 27, 1920.

1,404,145.

Patented Jan. 17, 1922.
3 SHEETS—SHEET 1.

Witness:
R. L. Tarrington

Inventor:
John Rietschel
by Albert Scheith Attorney

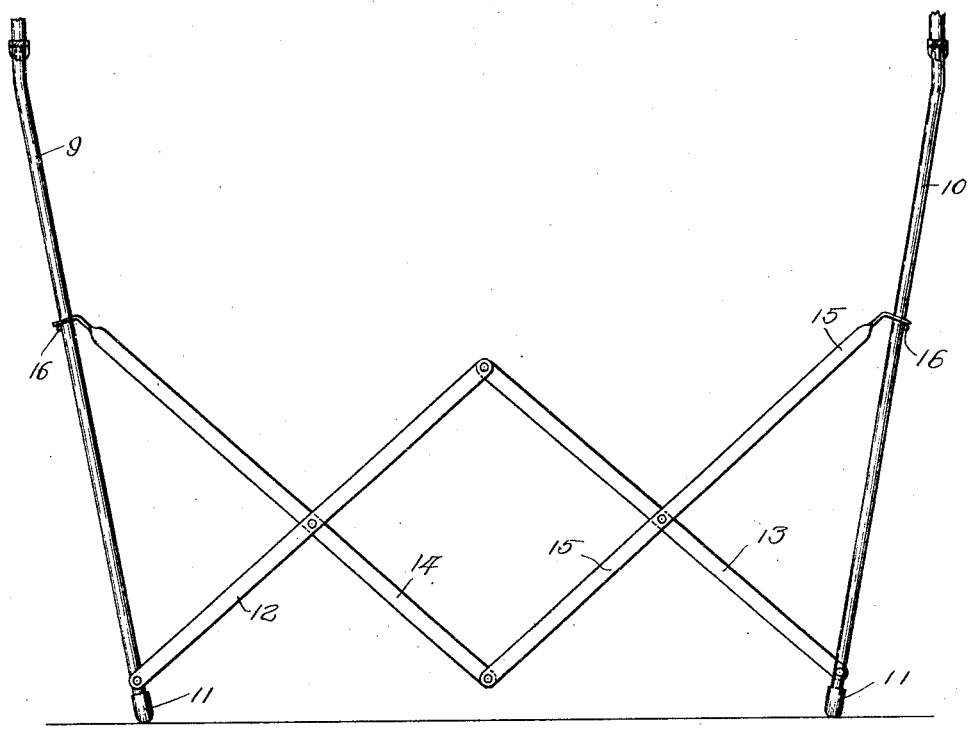
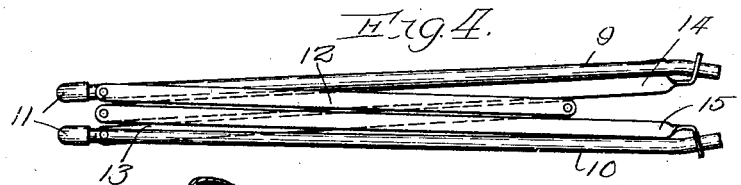
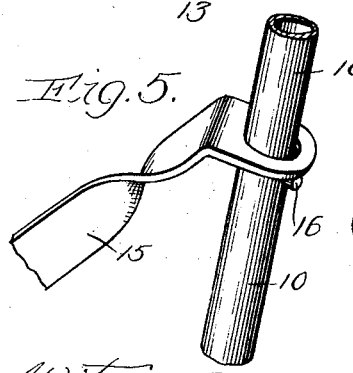
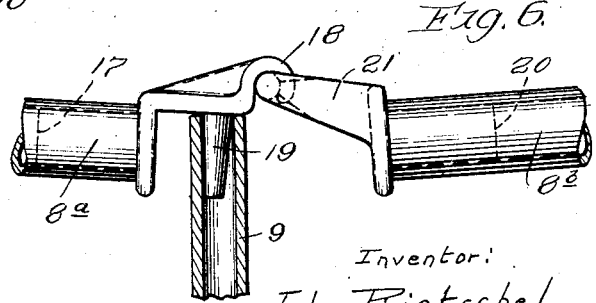

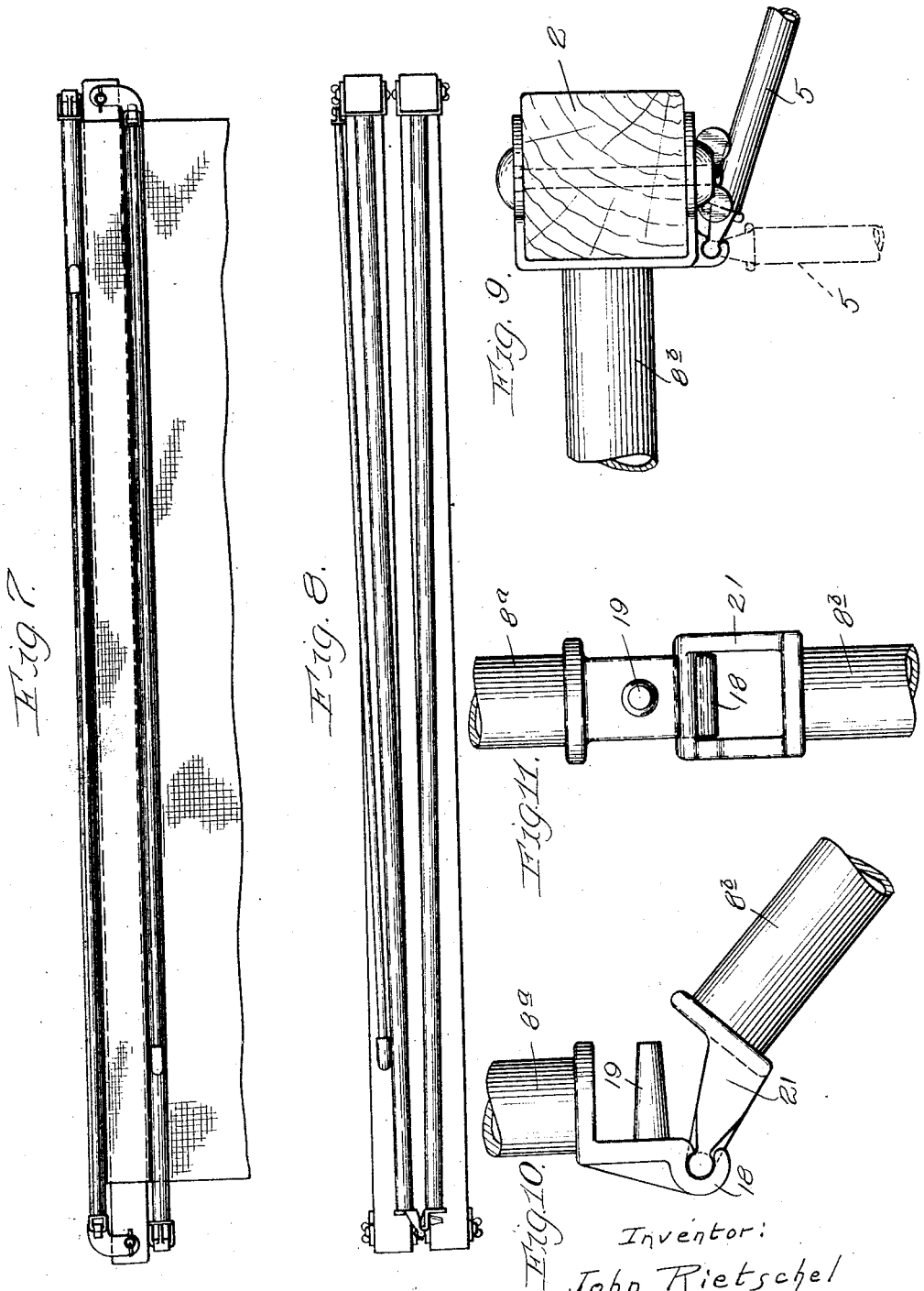

UNITED STATES PATENT OFFICE.

JOHN RIETSCHEL, OF OAK PARK, ILLINOIS, ASSIGNOR TO TENTOBED COMPANY, OF CHICAGO, ILLINOIS, A CORPORATION OF ILLINOIS.

AUTOBED.

1,404,145.

Specification of Letters Patent. Patented Jan. 17, 1922.

Application filed August 27, 1920. Serial No. 406,439.

*To all whom it may concern:*

Be it known that I, JOHN RIETSCHEL, citizen of the United States, residing at Oak Park, Illinois, have invented certain new and useful Improvements in an Autobed; and I do hereby declare the following to be a full, clear, and exact description of the invention, such as will enable others skilled in the art to which it appertains to make and use the same.

My invention relates to folding cots and in its general aspects aims to provide novel means for supporting the frame of the cot, for interlocking the frame with its supports, and for securing various frame portions to one another. In one of its more particular aspects, my invention relates to a novel means for pivoting the portions of an articulated side rail for a cot to each other and of connecting such a side rail to its supports, and preferably for accomplishing both of these objects without the use of rivets, bolts or other auxiliary fastening elements. In another aspect, my invention aims to provide an expansible member substantially forming a truss and adapted to afford part of the support for both side rails of a cot, and in this aspect my invention aims to provide a support of this class which can readily be contracted laterally for compact storage and which will dispose its main supporting portions in proper operative relation when the said truss is expanded. For this purpose, I aim to provide a truss construction in which the constituent members are continuously connected to each other and in which they automatically adjust themselves to the expansion or contraction, so that no manipulation other than the lateral expansion or contraction of the truss is required for changing the latter from its expanded operative position to its contracted storage position, or vice versa. Furthermore, I desirably aim to provide an arrangement of this kind which will dispose the main supporting portions substantially parallel to each other when the truss is contracted, but which will cause them to diverge upwardly when the truss is expanded, thereby affording a support suitable for use upon a base narrower than the frame of the cot. Still further and more detailed objects will appear from the following specification and from the accompanying drawings, in which—

Fig. 3 is an enlarged elevation of the expansible truss which forms the center support for the side rails of the cots of Figs. 1 and 2, showing this in its expanded or operative position.

Fig. 4 is a similar view of the same truss when contracted for storage and shipping.

Fig. 5 is an enlarged perspective view of a portion of this same truss, showing the arrangement of the slidable connection between one of the risers and the lazy tongs.

Fig. 6 is an enlarged detail, partly in section, showing the connection between the pivotally joined parts of one of the side rails and the riser of the supporting truss.

Figs. 7 and 8 are enlarged views taken at right angles to each other and showing the disposition of the end rails and side rails when the cot frame is folded for storage.

Fig. 9 is an enlarged view of the end portion of one of the side rails, showing the manner of detaching the associated leg of the cot from the same.

Fig. 10 is a bottom view of the side rail joint shown in Fig. 6.

Fig. 11 is a side elevation of the same parts, showing the method of detaching the two sections of one of the side rails from each other.

Figure 1:
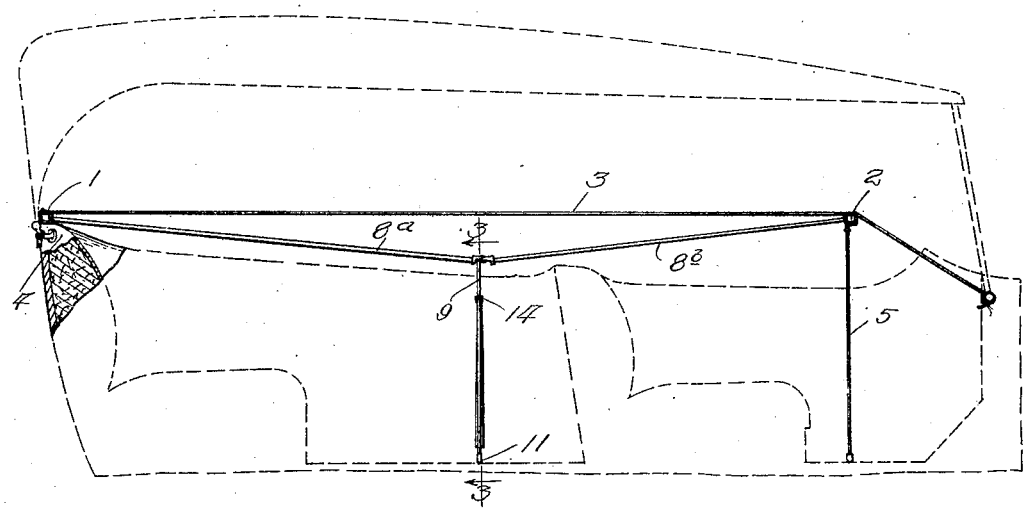
Fig. 1 is a side elevation of a cot embodying my invention and adapted for use within an automobile, the relative position of the associated parts of the automobile being indicated in dotted lines.
Figure 2:
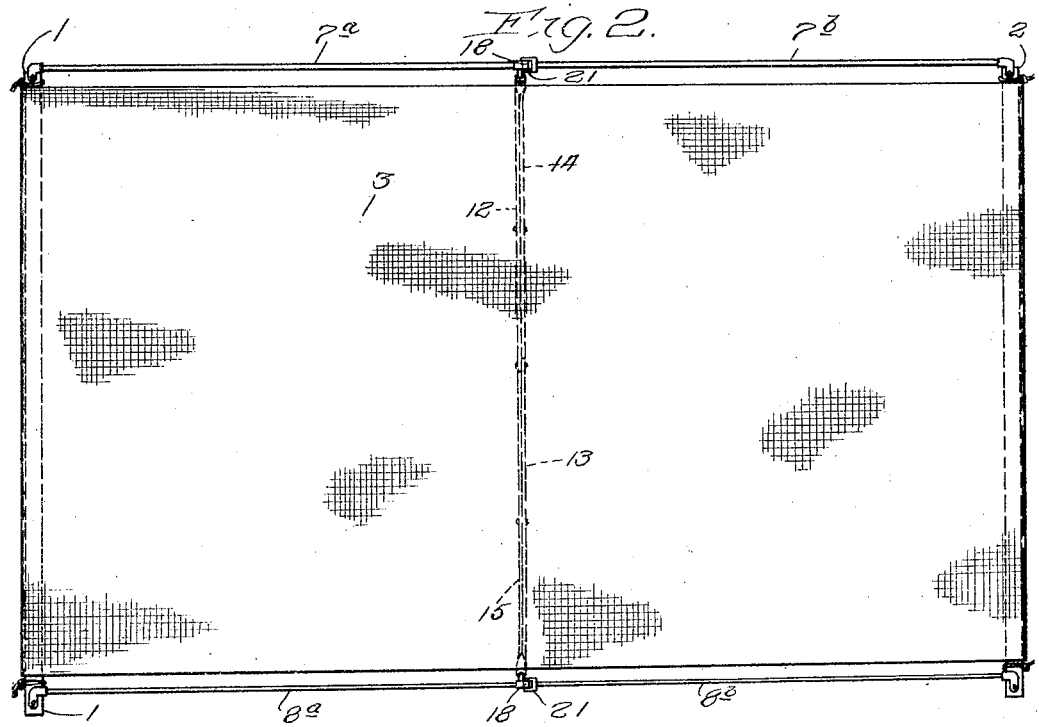
Fig. 2 is a plan view of the same cot, drawn on a slightly enlarged scale.

While the various features of my invention may be employed in connection with a variety of different types of cots and the like, these features are particularly adapted for use with folding cots of the type disclosed in application #255696 as filed September 25, 1918, by Isaac S. Purcell, namely cots adapted to be erected and used within an ordinary automobile. I am therefore illustrating and describing my invention as used in such a connection, although I do not wish to be limited to this application of the same. According to the disclosure of the said Purcell application, such a folding cot as designed for automobile use includes a pair of end rails 1 and 2 between which a bed-bottom 3 of canvas or the like is stretched. The rear end rail 1 is supported by the back 4 of the rear seat while the forward end rail 2 is supported by legs 5 which are pivoted to this forward end rail with freedom for movement both longitudinally and laterally of the vehicle. The two end rails are spaced from each other by a pair of side rails 7 and 8, each of which consists of two sections hinged to each other, and these side rails are also supported adjacent to their said hinged connections by a suitable rigid means extending upwardly from the floor of the vehicle. In the Purcell patent application above mentioned, this center support comprises a truss including links each of which is attachably bolted at one end to one of the risers. In practice, the use of such detachable fastenings is objectionable both on account of the time required for tightening and loosening the fastenings and on account of the danger of losing the nuts of the fastening bolts. Moreover, the use of wood for the risers and side rails as illustrated in the said Purcell patent application introduces the likelihood of splitting these parts, which is objectionable in practice.

To overcome these and other objections, my invention aims to construct such parts entirely of metal and to provide a medial supporting truss which can readily be expanded or contracted without removing or attaching any bolts or other loose parts. To accomplish this purpose, I employ a pair of risers 9 and 10, each of which is desirably made of steel tubing and equipped at its lower end with a rubber foot 11. Pivoted respectively to these risers near the lower end of each are a pair of links 12 and 13, which links are pivoted to each other at their upper ends. These links are also pivoted intermediate of their ends to a second pair of links 14 and 15, which latter links are pivoted to each other at their lower ends as shown in Fig. 3. Each of the links 14 and 15 is equipped at its free end with means for slidably engaging one of the risers, this being desirably done by constructing each of these links of flat steel, perforating the same near its free end with a bore slightly larger than the outside diameter of one of the risers, and then bending this perforated end of the link substantially as shown in Fig. 5. With the parts thus connected to each other, it will be obvious from Fig. 3 that the two pairs of links form a lazy tongs connection between the two risers, which connection will permit the resulting truss to be expanded laterally until the perforated ears on the links 14 and 15 engage suitable projections, such as pins 16, on the risers. By suitably proportioning the lengths of the parts and the location of the pivoted connections between the links, I cause the said perforated ears of the links to maintain their sliding connections to the risers even when the truss is contracted for storage as shown in Fig. 4, so that the parts always remain properly assembled.

To increase the permissible width of the bed of the cot, I desirably proportion the lazy tongs connection so that it will cause the risers to diverge upwardly when these tongs are expanded; that is to say, I desirably make the links 14 and 15 of equal lengths but longer than the links 12 and 13 and locate the various pivot points so that the risers 9 and 10 will be drawn into substantially parallel relation when the truss is contracted. I also desirably bend the upper ends of the risers 9 and 10 towards each other so that these end portions will both be disposed vertical, or parallel to each other, when the truss is expanded.

For the frame of the cot, I desirably provide side rails each consisting of a pair of steel tubes hinged to each other to permit a compact collapsing of the frame, and desirably connect the two tubular sections of each side rail by a hinge so constructed that a part of this hinge will afford a socket connection to the top of the adjacent riser of the medial truss. For this purpose, I desirably mount in one of the tubular end rail sections 8$^a$ a core 17 forming part of a malleable hinge casting which includes a hook 18 and which also has a downwardly directed projection 19 adapted to socket in the upper end of the adjacent riser, as shown in Fig. 6. Then I fasten within the companion and end rail section 8$^b$ the core 20 of a companion casting having a loop 21 adapted to interlock with the said hook 18. This loop 21 desirably has its lateral portions slightly contracted near their edges of its transverse end portion, so that these end portions may be slid into position when the hinged parts are inverted and the side rail parts are swung into the abnormal position shown in Fig. 10, the gap of the hook being too small to permit the loop to be slid out of this position when the hinge parts are in their normal relative positions as shown in Fig. 6. With the parts thus arranged, the hinges in the side rail members permit a ready assembling of these members without requiring any bolts, rivets or other auxiliary fastening elements, and the resulting connections permit these side rail members to be doubled upon each other when the cot frame is folded for storage as illustrated in Figs. 7 and 8 and as more fully described in the said Purcell patent application.

For the forward supports of the cot frame I also desirably employ legs made of steel tubing and desirably connect each of these legs to the same malleable casting which connects the end rail and side rail at the adjacent corner of the cot frame. For this purpose, I preferably secure the adjacent side rail to a fork swiveled to the end rail after the manner of Fig. 9 and provide this fork with a hook presenting a substantially horizontal opening. Then I mount within the top of the adjacent leg 5 a core made integral with a loop adapted to engage the said hook, and I desirably thin the sides of the said loop adjacent to the cross bar of the loop so as to permit the loop to be slid into operative relation with the hook when the leg is swung out of its normal position substantially into the position of Fig. 9. I also provide sufficient free play between the said loop and hook so that the loop and the leg carried thereby may be swung both forwardly and laterally of the cot frame about this pivotal connection.

By thus employing steel tubes instead of wooden frame parts I am able to produce cot frames and supports which are much neater in appearance and more dependable in strength than those obtained with the wooden parts as previously used, and by avoiding the use of bolts or other table fastening elements, I entirely prevent the loss of parts which is apt to prove quite serious in its results for the travelers who use folding cots of this general class. However, while I have mentioned certain materials as desirable for some parts of the illustrated construction and have pictured these in a desirable shaping of the various parts, I do not wish to be limited to these or other details of the construction and arrangement here disclosed, it being obvious that the same might be modified in many ways without departing from the spirit of my invention or from the appended claims.

I claim as my invention:

1. The combination with a folding cot frame comprising a pair of end rails and a pair of side rail members spanning the end rails, of a hook carried by one of the said members adjacent to its juncture with the other member, and a supporting leg equipped at its upper end with swiveling means engaging the said hook and arranged for permitting movement of the leg substantially in the same vertical planes with either the adjacent side rail member or the adjacent end rail.

2. The combination with a folding cot frame comprising a pair of end rails and a pair of side rail members connecting the same, each of the said side rail members comprising a pair of rail portions pivotally connected to each other, of an expansible truss for supporting the side rail members at their said pivotal points, the truss including a pair of end risers and each of the side rail members having means for socketing upon the upper end of one of the said risers.

3. A cot frame construction as per claim 2, in which each end riser of the truss is tubular and in which each side rail member has its two parts connected by a hinge including a downwardly directed projection entering the upper end of the adjacent riser.

Signed at Chicago, Illinois, August 23rd, 1920.

JOHN RIETSCHEL.